(12) United States Patent
Fetzmann et al.

(10) Patent No.: US 8,165,810 B2
(45) Date of Patent: Apr. 24, 2012

(54) SYSTEM FOR ASSISTING THE GROUND NAVIGATION OF AN AEROPLANE IN AN AIRPORT

(75) Inventors: Fabien Fetzmann, Cugnaux (FR); Pierre Coldefy, Toulouse (FR); Armand Jacob, Pibrac (FR); Stephane Collins, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 789 days.

(21) Appl. No.: 11/910,509

(22) PCT Filed: Mar. 30, 2006

(86) PCT No.: PCT/FR2006/000690
§ 371 (c)(1),
(2), (4) Date: Oct. 2, 2007

(87) PCT Pub. No.: WO2006/106211
PCT Pub. Date: Oct. 12, 2006

(65) Prior Publication Data
US 2008/0147315 A1 Jun. 19, 2008

(30) Foreign Application Priority Data
Apr. 4, 2005 (FR) ...................................... 05 03270

(51) Int. Cl.
*G01C 21/00* (2006.01)
(52) U.S. Cl. ............ 701/538; 701/3; 701/408; 701/409; 701/432; 340/995.1; 340/995.14; 340/995.15; 340/995.16; 340/995.17; 340/995.26; 340/995.27; 340/972; 715/788
(58) Field of Classification Search .............. 701/3, 200, 701/207, 208; 340/995.1, 995.14, 995.15, 340/995.17, 995.26, 995.27, 971, 972; 715/788
See application file for complete search history.

(56) References Cited

U.S. PATENT DOCUMENTS

| | | | | |
|---|---|---|---|---|
| 6,112,141 A | * | 8/2000 | Briffe et al. ...................... | 701/14 |
| 6,128,553 A | * | 10/2000 | Gordon et al. .................... | 701/3 |
| 6,389,355 B1 | * | 5/2002 | Gibbs et al. ................... | 701/206 |

(Continued)

FOREIGN PATENT DOCUMENTS

EP  1 091 190  4/2001

(Continued)

OTHER PUBLICATIONS

PCT International Search Report dated Aug. 10, 2006.

(Continued)

*Primary Examiner* — Jack W Keith
*Assistant Examiner* — Rami Khatib
(74) *Attorney, Agent, or Firm* — Dickinson Wright PLLC

(57) ABSTRACT

A navigation system includes a display device displaying, on a cockpit pilot display unit, a set of indications including an aircraft symbol which illustrates the position of the aircraft and a map part which represents the airport and moves in relation to the aircraft symbol according to the current position of the aircraft in the airport, the aircraft symbol fixed on the cockpit pilot display unit in a centered position in a standard display. The system also has an actuating unit for deactivating the standard display to enable the aircraft symbol to be displaced on the cockpit pilot display unit, and an actuating unit for controlling a temporary displacement of the set of indications on the cockpit pilot display unit such that the aircraft symbol displayed moves away from the centered position.

13 Claims, 5 Drawing Sheets

U.S. PATENT DOCUMENTS

| | | | |
|---|---|---|---|
| 6,452,570 B1 * | 9/2002 | Kuenzner | 345/7 |
| 6,922,631 B1 * | 7/2005 | Dwyer et al. | 701/206 |
| 7,109,889 B2 * | 9/2006 | He | 340/971 |
| 7,123,999 B2 * | 10/2006 | Lafon et al. | 701/3 |
| 7,148,816 B1 * | 12/2006 | Carrico | 340/961 |
| 7,222,017 B2 * | 5/2007 | Clark et al. | 701/120 |
| 7,239,964 B2 * | 7/2007 | Takizawa | 701/211 |
| 7,307,549 B2 * | 12/2007 | Firra | 340/974 |
| 7,321,318 B2 * | 1/2008 | Crane et al. | 340/971 |
| 7,382,284 B1 * | 6/2008 | Armstrong et al. | 340/958 |
| 7,382,288 B1 * | 6/2008 | Wilson et al. | 340/972 |
| 7,552,011 B2 * | 6/2009 | Ishii et al. | 701/213 |
| 2004/0158363 A1 * | 8/2004 | Lafon et al. | 701/3 |
| 2006/0265109 A1 | 11/2006 | Canu-Chiesa et al. | |

FOREIGN PATENT DOCUMENTS

FR 2 854129 10/2004

OTHER PUBLICATIONS

S. Kamineni, et al. "Electronic moving map of airport surface on electronic flight bag," Digital Avionics Systems Conference, Oct. 24, 2004, pp. 4C3-4C41.

F. Roefs, et al. "Integrating routing in surface guidance displays," Digital Avionics Systems Conference, Oct. 24, 2004, pages 4C5-4C41.

* cited by examiner

SYSTEM FOR ASSISTING THE GROUND NAVIGATION OF AN AEROPLANE IN AN AIRPORT

TECHNICAL FIELD OF THE INVENTION

The present invention relates to a system for assisting the ground navigation of an airplane in an airport.

BACKGROUND OF THE INVENTION

Although not exclusively, the present invention applies more particularly to a system which comprises a cockpit viewing screen, for example:
- of ND ("Navigation Display") type, that is to say a navigation screen which is used in a customary manner to present in flight the plot of the route desired for the airplane, that is to say which provides a graphical representation of the flight plan of the airplane and of the situation of the airplane on this flight plan; or
- of OIT ("Onboard Information Terminal") type, that is to say an onboard information screen which is multifunctional and which is in particular used to display the electronic documentation of the airplane.

Within the framework of the present invention, the system for assisting airport navigation is of the type comprising:
- at least one means for determining the current position of the airplane;
- at least one cartographic database of the airport in which said airplane is situated; and
- a display device comprising at least one cockpit viewing screen which is capable of displaying a display mode at least of a first type, for which said cockpit viewing screen presents at least:
  - an airplane symbol which illustrates said current position of the airplane and which is fixed at a predetermined centered position; and
  - a part of a map which represents at least partially the airport in which said airplane is situated. Said map part is mobile and tied to the motion of the airplane so as to move with respect to said fixed airplane symbol in conformity with the current position of the airplane in said airport, according to a standard display.

In a customary manner, a display mode of the aforesaid first type can be a customary mode termed arc or a customary mode termed rose.

Generally, a cockpit viewing screen is also capable of displaying a display mode of a second type, termed plan mode, for which the cockpit viewing screen presents at least one auxiliary map part which is fixed and an auxiliary symbol (illustrating the current position of the airplane) which is mobile. Such a plan mode makes it possible moreover for an operator, in particular the pilot of the airplane, to move the map part displayed in the direction and by the amplitude that he desires. Such a free movement is not possible in the arc and rose modes, since in these two cases the display is kept centered on the airplane symbol which is fixed.

Now, in the course of airport navigation, the pilot is often required to consult information which is far removed from the current position of the airplane, for example to prepare for taxiing or to anticipate maneuvers. Such a consultation is easily achievable in plan mode, since it suffices in this case for the pilot to move the map to display the part of the airport in which he is interested.

On the other hand, in arc mode and in rose mode, if the pilot has to consult information which is situated at a distance from the airplane greater than that displayed in accordance with the selected scale of the display mode, he has:
- either to modify this scale so as to display a more significant zone of the airport, thereby, however, causing him to lose significant information since the displayed level of details is dependent on the scale selected;
- or to switch to plan mode so as to carry out the consultation, which is, however, neither recommended nor acceptable during airport navigation, since the display is then no longer centered on the airplane so that the system no longer adequately fulfills its principal function of assisting navigation.

SUMMARY OF THE INVENTION

The present invention relates to a system for assisting the ground navigation of an airplane in an airport, which makes it possible to remedy the aforesaid drawbacks.

For this purpose, according to the invention, said system of the type comprising:
- at least one means for determining the current position of the airplane;
- at least one cartographic database at least of the airport in which said airplane is situated; and
- a display device comprising at least one cockpit viewing screen which is capable of displaying a display mode at least of a first type, for which said cockpit viewing screen presents a set of navigation indications comprising at least:
  - an airplane symbol which illustrates said current position of the airplane; and
  - a part of a map which represents at least partially the airport, said map part being mobile and always tied to the motion of the airplane so as to move with respect to said airplane symbol in conformity with the current position of the airplane in said airport, said airplane symbol being fixed on said cockpit viewing screen at a predetermined centered position in a standard display,
is noteworthy in that said system moreover comprises:
- first actuation means which are capable of being actuated by an operator, so as to deactivate said standard display in such a way as to allow a movement of said airplane symbol on said cockpit viewing screen; and
- second actuation means which are capable of being actuated by an operator, so as to control, when said first actuation means are actuated, a temporary movement of said set of navigation indications on said cockpit viewing screen so that the displayed airplane symbol is then no longer situated at said centered position, a relaxation of said first actuation means automatically causing a return to said standard display.

Thus, by virtue of the invention, an operator, in particular a pilot of the airplane, is able to move said displayed set of navigation indications (comprising in particular said displayed map part and said airplane symbol), in particular to seek information situated initially outside of the display field, doing so in a display mode of the aforesaid first type for which the display (standard display) is in principle centered on the airplane symbol which is in principle fixed. Such a display mode of the first type is very effective for assisting the pilot during airport navigation, since it provides information relating to the elements situated all around (rose mode) or at the very least in front of (arc mode) the airplane.

Moreover, the movement controlled by the operator is a solely temporary movement. Specifically, right from the relaxation of the first actuation means, the display device automatically returns to the standard display so that right from the end of an action for moving the set of navigation indications (that is to say information consultation), the pilot has available a (standard) display which is centered on the airplane symbol, as specified below and which is therefore suited to airport navigation.

Consequently, the system in accordance with the invention makes it possible at one and the same time to provide the pilot with the customary information necessary for airport navigation and to enable a (temporary) search for information on an undisplayed part of the airport, thereby making it possible to remedy the aforesaid drawbacks.

In a particular embodiment, said display device is formed so as to be able to display separately and successively a plurality of different display modes, and said system comprises, moreover, third actuation means capable of being actuated by an operator so as to change display mode.

According to the invention, said display device is formed so as to be able to display, as display mode of the first type:
- a mode termed arc, for which said fixed airplane symbol (that is to say said aforesaid centered position) is situated at the bottom of the cockpit viewing screen, several circular arcs being centered on said airplane symbol; or
- a mode termed rose, for which said fixed airplane symbol (that is to say said aforesaid centered position) is situated at the center of the cockpit viewing screen, several circles being centered on said airplane symbol.

Furthermore, in a particular embodiment, said display device is formed so as to be able to display moreover a display mode of a second type, in particular a mode termed plan mode, for which the cockpit viewing screen presents at least one auxiliary map part which is fixed and an auxiliary airplane symbol which illustrates the current position of the airplane and which is mobile.

Moreover, in a preferred embodiment, said first and second actuation means form part of an actuation unit.

In this case, advantageously, said actuation unit can comprise:
- a mouse for controlling a cursor of the cockpit viewing screen; and/or
- a keyboard which comprises keys furnished with movement arrows corresponding to said second actuation means; and/or
- a keyboard comprising alphanumeric keys; and/or
- touch sensitive zones of said cockpit viewing screen.

Furthermore, in a particular embodiment, said actuation unit is formed so as also to allow the movement of a set of navigation indications when the display device displays a display mode of a second type, for which the cockpit viewing screen presents, as set of navigation indications, at least one auxiliary map part which is fixed and an auxiliary airplane symbol which illustrates the current position of the airplane and which is mobile.

Additionally, advantageously, the system in accordance with the invention comprises, moreover, a control means which is automatically triggered when said first actuation means are actuated and which automatically controls a return to a standard display if said second actuation means are not actuated for a predetermined duration after the triggering of said control means. This predetermined duration is a duration T1 for example 5 seconds, that the first actuation means of KCCU type (or "trackball") use before toggling the value of a customary Boolean "CCD KEYLCK" from 0 to 1. This signifies that if the operator actuates the first actuation means (KCCU click) without actuating the second actuation means (ball movement) before the end of the duration T1, the standard display is returned to. It is also possible to envisage a return to a standard display, if the first actuation means are still not relaxed after a predetermined duration T2, for example 30 seconds, the countdown for which begins with the actuation of said second actuation means.

BRIEF DESCRIPTION OF THE DRAWINGS

The figures of the appended drawing will clearly elucidate the manner in which the invention may be embodied. In these figures, identical references designate similar elements.

DETAILED DESCRIPTION OF THE INVENTION

Figure 1:
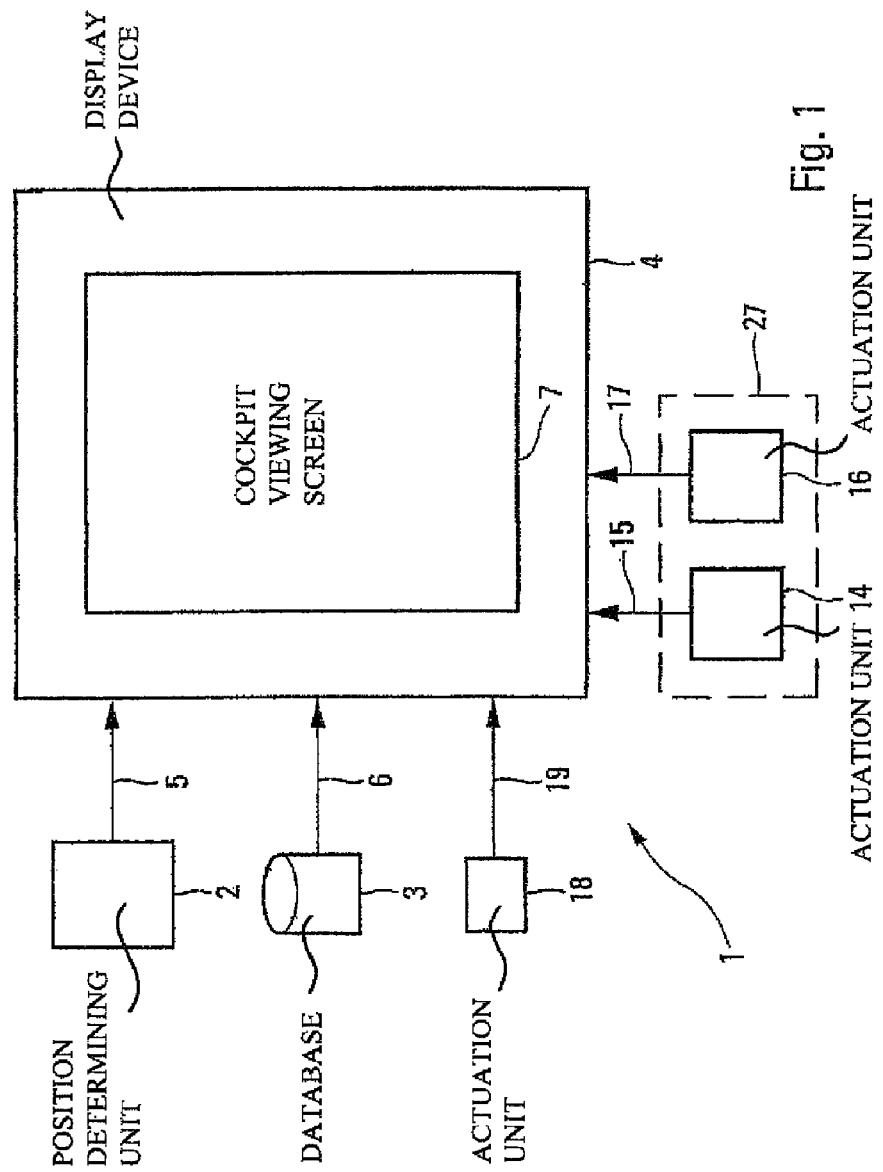
FIG. 1 is the schematic diagram of a system in accordance with the invention.

The system 1 in accordance with the invention and diagrammatically represented in FIG. 1 is intended to assist a pilot of an airplane, in particular of a transport airplane, during the ground navigation (taxiing) of said airplane in an airport.

Therefore, said system 1 comprises:
- a means 2 for determining, in a customary manner, at least the current position of the airplane in the airport;
- a database 3 which comprises cartographic data of digital type at least of said airport, in which said airplane is situated; and
- a display device 4 which is connected by way of links 5 and 6 respectively to said means 2 and to said database 3 and which comprises at least one cockpit viewing screen 7.

Figure 2:
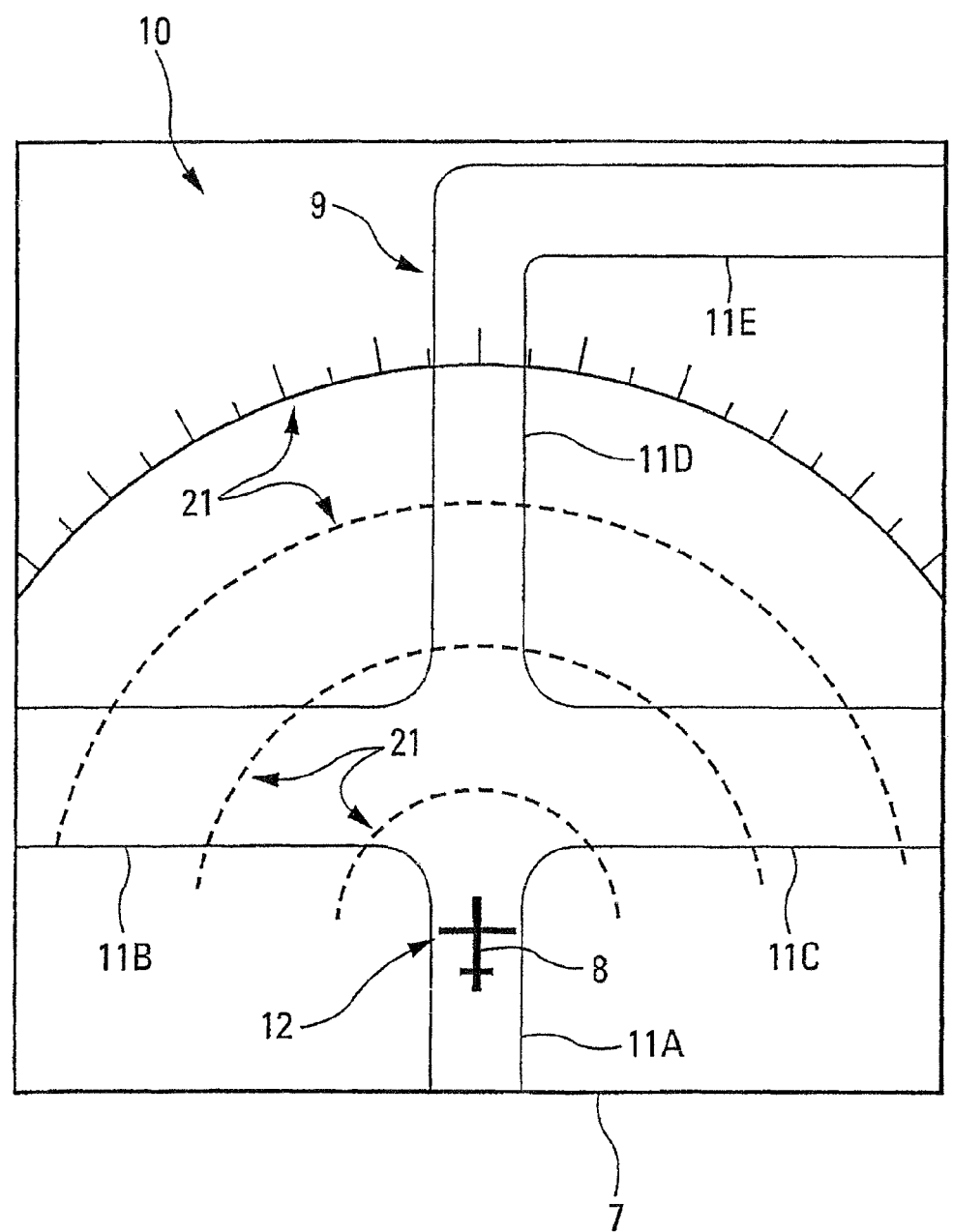
FIG. 2 diagrammatically shows a cockpit viewing screen displaying a display mode of arc type, associated with a standard display.
Figure 3:
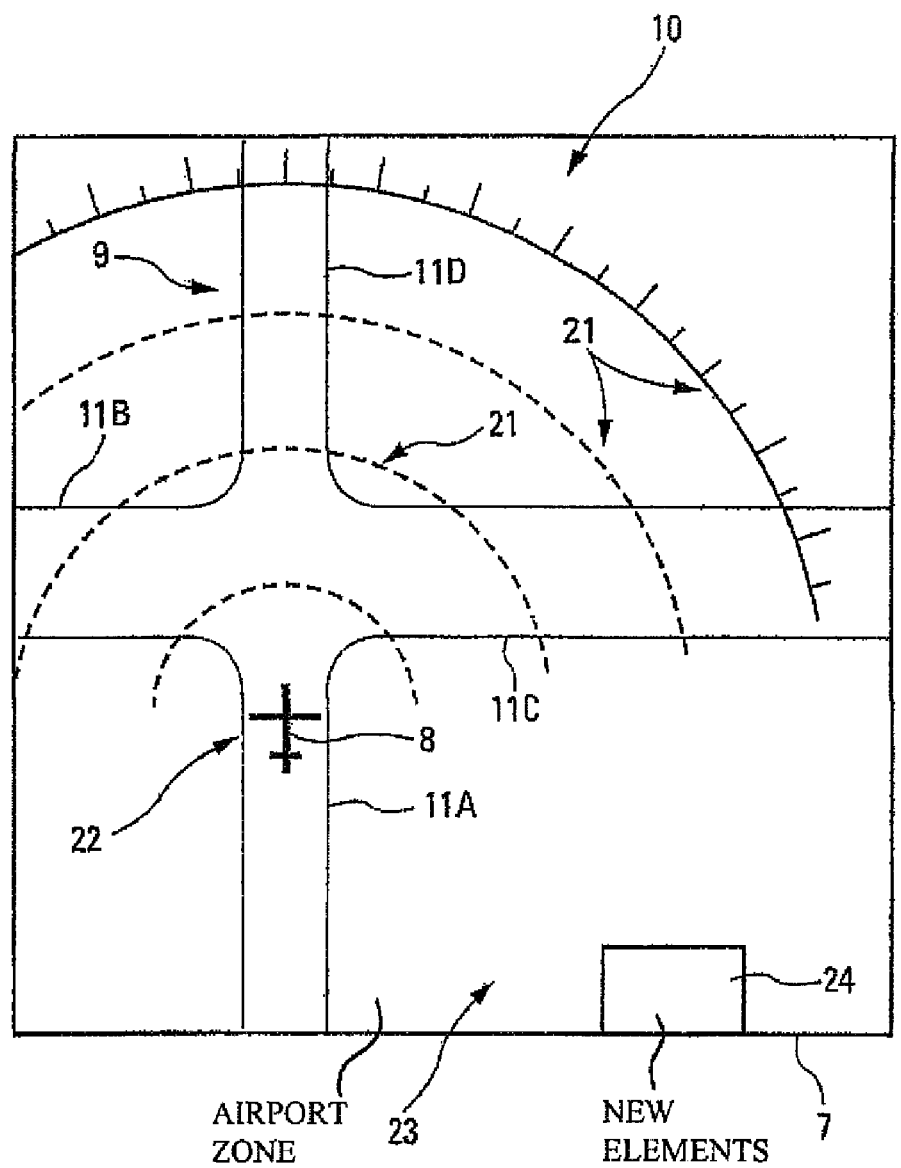
FIG. 3 shows the same cockpit viewing screen as FIG. 2, following a temporary movement of the map part displayed, in accordance with the present invention.
Figure 4:
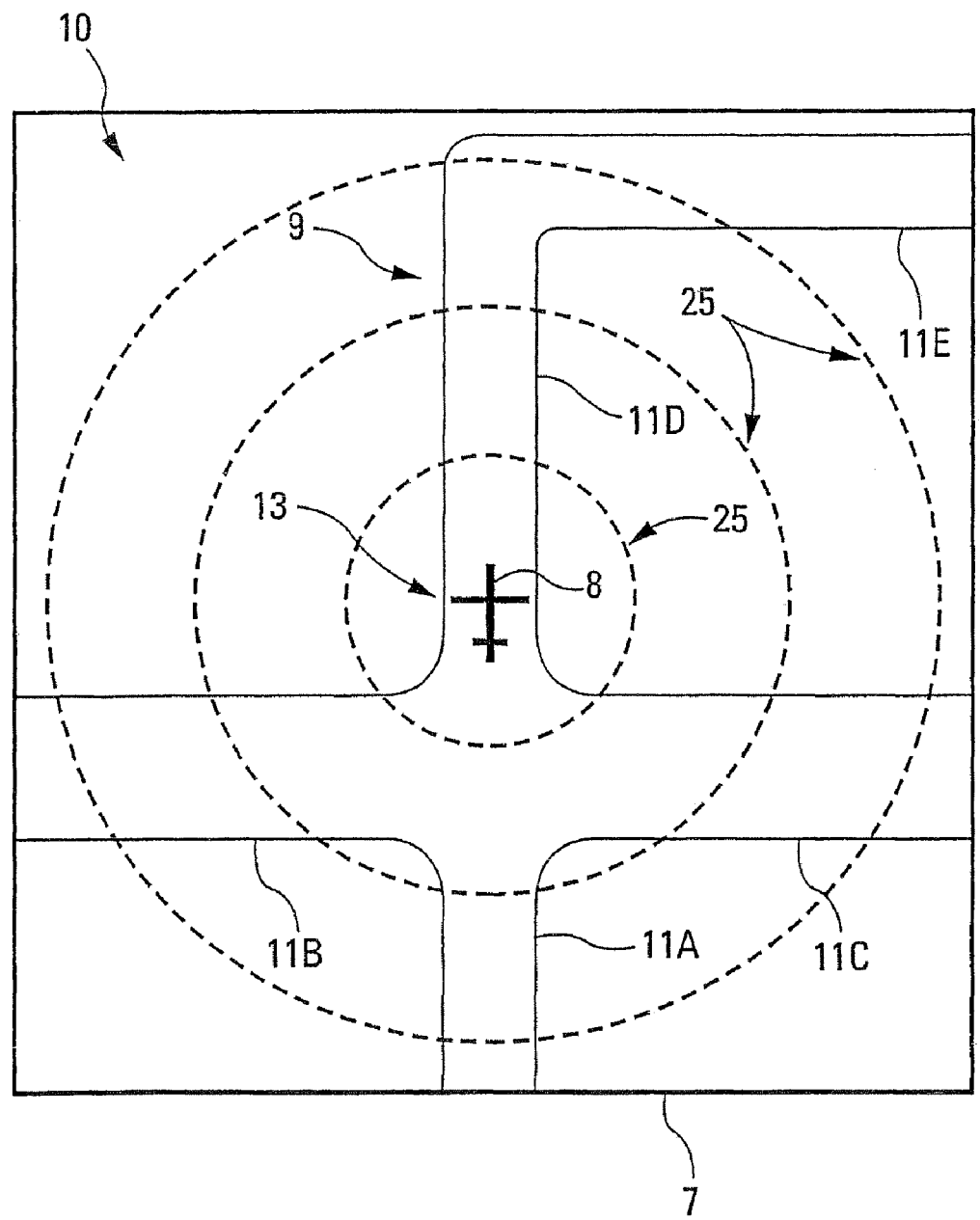
FIG. 4 diagrammatically shows a cockpit viewing screen displaying a display mode of rose type, associated with a standard display.

This cockpit viewing screen 7 is capable of displaying a display mode at least of a first type, for which said cockpit viewing screen 7 presents a set of navigation indications 10 comprising at least, as represented in FIGS. 2 to 4:
- an airplane symbol 8 which illustrates the current position of the airplane, which is received from said means 2; and
- a part of a map 9 which represents at least partially the airport. Said map part 9 shows elements of the airport, in particular taxiing lanes 11A, 11B, 11C, 11D, 11E such as landing strips, taxiways or access linkways for example. This map part 9 is mobile on the cockpit viewing screen 7 and is always tied to the motion of the airplane so as to move with respect to said airplane symbol 8 in conformity with the actual current position of the airplane in said airport.

Moreover, according to a standard display, said airplane symbol 8 is fixed at a predetermined centered position 12, 13, specified below. The mobile map part 9 therefore moves with respect to said fixed airplane symbol 8.

According to the invention, said system 1 moreover comprises:
- actuation means 14 specified below, which are connected by way of a link 15 to said display device 4 and which are capable of being actuated by an operator, in particular the pilot of the airplane, so as to deactivate said standard display in such a way as to allow a movement of said airplane symbol 8 on said cockpit viewing screen 7; and actuation means 16 also specified below, which are connected by way of a link 17 to said display device 4, and which are capable of being actuated by the operator, so as to control, when said actuation means 14 have been previously actuated, a temporary movement of said set of navigation indications 10 on said cockpit viewing screen 7 so that the airplane symbol 8 is then no longer situated at said centered position 12, 13. During such a movement, the airplane symbol 8 moves in a manner tied to said map part 9 so as to be in conformity with the actual current position of the airplane in said airport.

This movement is solely temporary. Specifically, any relaxation of said actuation means 14, that is to say any stoppage of their actuation, automatically engenders a return to said aforesaid standard display, for which the airplane symbol 8 is fixed at said centered position 12, 13.

Thus, by virtue of the system 1 in accordance with the invention, an operator, in particular a pilot of the airplane, is able to move the displayed set of navigation indications 10 (comprising in particular said map part 9 and said airplane symbol 8), in particular to seek information situated initially outside of the display field of said cockpit viewing screen 7, doing so in a display mode of said first type for which the display (aforesaid standard display) is in principle centered on the airplane symbol 8 which is in principle fixed. Such a display mode of the first type is very effective for assisting the pilot during airport navigation, since it provides the information situated in proximity to the current position of the airplane, as specified below.

Moreover, the movement controlled by the operator is a temporary movement, since, right from the relaxation of the actuation means 14, the display device 4 automatically returns to the standard display so that right from the end of an action for moving the set 10 (that is to say information consultation), the pilot has available a (standard) display which is centered on the fixed airplane symbol 8 (at the corresponding centered position 12, 13).

Consequently, the system 1 in accordance with the invention makes it possible at one and the same time:

to provide the pilot with the customary information necessary for airport navigation (standard display); and to enable a (temporary) information search on an undisplayed part of the airport (movement of the set 10).

Furthermore, the movement controlled by the operator is preferably a continuous movement, in particular for reasons of comfort of visual monitoring of the cockpit viewing screen 7 by the operator.

In a particular embodiment, said display device 4 is formed so as to be able to display separately and successively a plurality of different display modes, and said system 1 comprises, moreover, customary actuation means 18, which are connected by way of a link 19 to said display device 4 and which are capable of being actuated by an operator so as to change display mode.

According to the invention, said display device 4 is formed so as to be able to display, as display mode of the first type, in particular a customary mode termed arc, for which said airplane symbol 8 presents a fixed centered position 12 which is situated vertically at the bottom and horizontally at the center of the cockpit viewing screen 7, as represented in FIG. 2. This airplane symbol 8 is oriented upwards. Moreover, this airplane symbol 8 is situated at the center of several circular arcs 21, which define in a customary manner a heading scale and a distance scale. FIG. 2 therefore corresponds to a customary standard display relating to an arc mode.

As regards FIG. 3, it illustrates a controlled movement of the set of navigation indications 10 in accordance with the present invention, on the basis of the standard display of FIG. 2. In this case, the airplane symbol 8 is no longer fixed and is no longer situated at the initial centered position 12, but at a shifted or off-centered position 22. The movement of the set of navigation indications 10 makes it possible to display at least one zone 23 of the airport which was not displayed according to said standard display and thus to reveal other elements 24 of said airport, for example buildings or taxiing lanes. This controlled movement therefore allows the pilot to carry out a consultation of information on an airport part (zone 23) initially not displayed.

Furthermore, the display device 4 is also formed so as to be able to display, as display mode of the first type, a mode termed rose which is represented in FIG. 4, and for which the airplane symbol 8 is fixed and is situated at the center (position 13) of the cockpit viewing screen 7. This airplane symbol 8 is oriented upwards. Several circles 25 which are concentric with said airplane symbol 8 provide reference scales for rapidly and visually measuring the distances and the heading. According to the standard display, the map part 9 is mobile and tied to the motion of the airplane so as to move with respect to said fixed airplane symbol 8 in conformity with the current position of the airplane in the airport.

Figure 5:
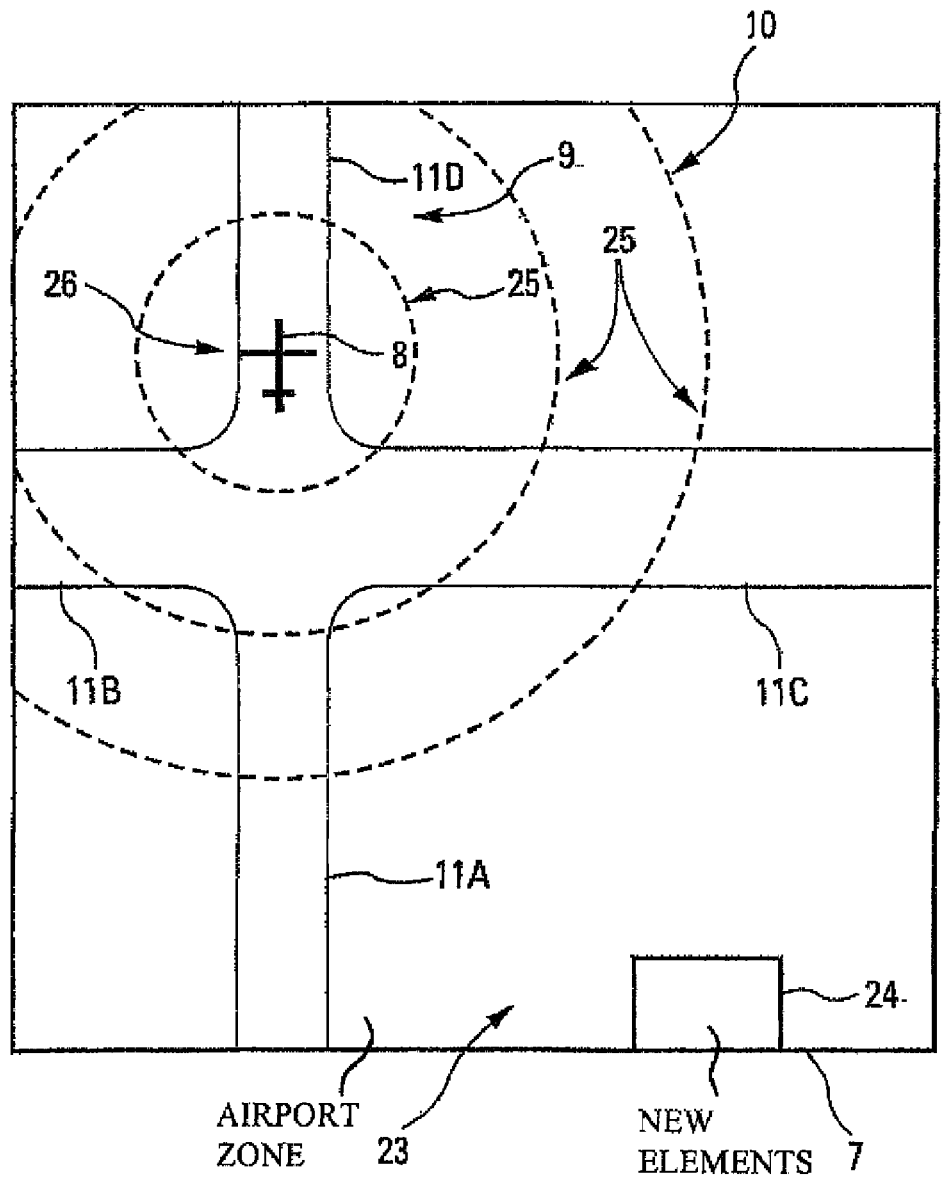
FIG. 5 shows the same cockpit viewing screen as FIG. 4, following a temporary movement of the map part displayed, in accordance with the present invention.

As indicated previously, by virtue of the system 1 in accordance with the invention, the pilot can deactivate said standard display so as to allow a temporary movement of said set of navigation indications 10 on said cockpit viewing screen 7 so that the airplane symbol 8 displayed is then no longer situated at said centered position (central position 13) but at an off-centered or shifted position 26, as is represented in FIG. 5.

Such a movement therefore makes it possible to display at least one initially undisplayed zone 23 of the airport, comprising new elements 24.

Moreover, in a preferred embodiment, said actuation means 14 and 16 form part of an actuation unit 27.

Within the framework of the present invention, said actuation unit 27 can comprise in particular:

a customary mouse for controlling a cursor of the cockpit viewing screen 7; and/or a customary keyboard which comprises alphanumeric keys; and/or a customary keyboard which comprises in particular keys furnished with movement arrows. These movement arrows correspond to said actuation means 16. In this case, it is for example possible to envisage that the actuation:

of an upward directed arrow, engenders a downward movement of the set of navigation indications 10;

of a downward directed arrow, engenders an upward movement of the set of navigation indications 10;

of a rightward directed arrow, engenders a leftward movement of the set of navigation indications 10;

of a leftward directed arrow, engenders a rightward movement of the set of navigation indications 10.

Moreover, it is possible to envisage that each actuation of an arrow causes a movement (in the corresponding direction) along a predetermined distance, for example along half the length or half the width of the cockpit viewing screen 7 as a function of the arrow (vertical or horizontal) actuated; and/or touch sensitive zones or an area of said cockpit viewing screen 7. In this case, in order to deactivate the standard display, it suffices to touch said sensitive cockpit viewing screen 7 (thereby representing said actuation means 14), for example with a finger or an appropriate customary means, and in order to produce a movement of the set 10, it is simply necessary to move said element (finger, appropriate means) which is in contact with said cockpit viewing screen 7.

Moreover, said display device 4 is formed so as to be able to display a display mode of a second type, termed plan mode (not represented), for which the cockpit viewing screen 7 presents at least:

an auxiliary map part which is fixed; and an auxiliary airplane symbol which illustrates the current position of the airplane and which is mobile on said fixed auxiliary map part.

In this case, in a preferred embodiment, said actuation unit 27 is also formed so as to allow the movement by an operator of the set of navigation indications 10, when the display device 4 displays such a plan mode.

Additionally, the system 1 in accordance with the invention comprises, moreover, a control means (not represented) which is automatically triggered when said actuation means 14 are actuated and which automatically controls a return to a standard display if said actuation means 16 have not been actuated at the term of a predetermined duration, after the triggering of said control means. This predetermined duration is a duration T1, for example 5 seconds, that the actuation means 14 for example of KCCU type (or "trackball") use before toggling the value of a customary Boolean "CCD KEYLCK" from 0 to 1. This implies that if the operator actuates the actuation means 14 (KCCU click) without actuating the actuation means 16 (ball movement) before the end of the duration T1, the standard display is returned to. It is also possible to envisage a return to a standard display, if the actuation means 14 are still not relaxed after a predetermined duration T2, for example 30 seconds, the countdown for which commences after having actuated the actuation means 16.

The invention claimed is:

1. A system for assisting the ground navigation of an airplane in an airport, said system comprising:
    at least one unit configured to determine the current position of the airplane;
    at least one cartographic database at least of the airport in which said airplane is situated;
    a display device comprising at least one cockpit viewing screen which displays a display mode at least of a first type, for which said cockpit viewing screen presents a set of navigation indications comprising at least:
        an airplane symbol which illustrates said current position of the airplane, and
        a part of a map which represents at least partially the airport, said map part being mobile and tied to the motion of the airplane so as to move with respect to said airplane symbol in conformity with the current position of the airplane in said airport, said airplane symbol being fixed on said cockpit viewing screen at a predetermined centered position in a standard display;
    a first actuation unit actuated by an operator, to deactivate said standard display to allow a movement of said airplane symbol on said cockpit viewing screen;
    a second actuation unit actuated by an operator to control, when said first actuation unit is actuated, a temporary and unlimited range of movement of said set of navigation indications on said cockpit viewing screen so that the displayed airplane symbol is no longer situated at said centered position, a stop of said first actuation unit automatically causing a return to said standard display; and
    a control unit which is automatically triggered when said first actuation unit is actuated and which automatically controls a return to the standard display if said second actuation unit is not actuated during a first predetermined duration after the triggering of said control unit.

2. The system as claimed in claim 1, wherein said display device is configured to display separately and successively a plurality of different display modes, and said system further comprises, a third actuation unit actuated by an operator so as to change display mode.

3. The system as claimed in claim 1, wherein said display device is configured to display, as display mode of the first type, a mode termed arc for which said fixed airplane symbol is situated at the bottom of the cockpit viewing screen, several circular arcs being centered on said airplane symbol.

4. The system as claimed in claim 1, wherein said display device is configured to display, as display mode of the first type, a mode termed rose for which said fixed airplane symbol is situated at the center of the cockpit viewing screen, several circles being centered on said airplane symbol.

5. The system as claimed in claim 1, wherein said display device configured to display a display mode of a second type, termed plan mode, for which the cockpit viewing screen presents at least one auxiliary map part which is fixed and an auxiliary airplane symbol which illustrates the current position of the airplane and which is mobile.

6. The system as claimed in claim 1, wherein said first and second actuation units form part of an actuation unit.

7. The system as claimed in claim 6, wherein said actuation unit comprises a control mouse of a cursor of the cockpit viewing screen.

8. The system as claimed in claim 6, wherein said actuation unit comprises a keyboard which comprises keys furnished with movement arrows corresponding to said second actuation unit.

9. The system as claimed in claim 6, wherein said actuation unit comprises a keyboard comprising alphanumeric keys.

10. The system as claimed in claim 6, wherein said actuation unit comprises touch sensitive zones of said cockpit viewing screen.

11. The system as claimed in claim 6, wherein said actuation unit configured to allow the movement of a set of navigation indications when the display device displays a display mode of a second type, for which the cockpit viewing screen presents, as set of navigation indications, at least one auxiliary map part which is fixed and an auxiliary airplane symbol which illustrates the current position of the airplane and which is mobile.

12. The system as claimed in claim 1, wherein it is configured to automatically control a return to a standard display, if after an actuation of said second actuation unit, said first actuation unit is not stopped after a second predetermined duration.

13. An airplane, comprising a system specified under claim 1.

* * * * *